United States Patent [19]

Yoshida et al.

[11] 4,405,221

[45] Sep. 20, 1983

[54] CAMERA MOTOR DRIVE MECHANISMS

[75] Inventors: Fumio Yoshida, Osaka; Yukio Miki, Sakai; Takeshi Egawa, Osaka, all of Japan

[73] Assignee: Minolta Camera Kabushiki Kaisha, Osaka, Japan

[21] Appl. No.: 311,188

[22] Filed: Oct. 14, 1981

[30] Foreign Application Priority Data

Nov. 6, 1980 [JP]  Japan .................. 55-155196

[51] Int. Cl.³ .............................. G03B 1/18
[52] U.S. Cl. .................... 354/173; 354/195; 354/214
[58] Field of Search .......... 354/25 R, 25 A, 25 P, 354/25 N, 31 F, 171, 173, 195, 214

[56] References Cited

U.S. PATENT DOCUMENTS 3,098,418  7/1963  Reiher et al.
4,204,759  5/1980  Yamada et al. ............... 354/173
4,294,527  10/1981  Hashimoto et al. ............ 354/173
4,344,682  8/1982  Hattori ......................... 354/173
4,362,370  12/1982  Iwata et al. ................... 354/173
4,364,649  12/1982  Mamiya et al. ............... 354/25 R

FOREIGN PATENT DOCUMENTS 137980  10/1979  German Democratic Rep. .......................... 354/173
3938326  of 0000  Japan.

Primary Examiner—Russell E. Adams
Attorney, Agent, or Firm—Watson, Cole, Grindle & Watson

[57] ABSTRACT

In a motor drive mechanism for a camera, a film winding mechanism is actuated by a first motor and a second motor is selectively connected to either a control device for automatically performing a preparatory photographic operation prior to the commencement of an exposure or to a film rewinding mechanism.

5 Claims, 6 Drawing Figures

CAMERA MOTOR DRIVE MECHANISMS

BACKGROUND OF THE INVENTION

1. Field of the Invention

The present invention relates to motor driven photographic cameras and in particular to such cameras provided with a motor, in addition to a built-in film winding motor, for driving camera control devices such as an automatic focus control device, automatic exposure control device and zooming control device, as well as for the film rewinding mechanism.

2. Description of the Prior Art

Japanese Utility Model Publication No. 39-38326 discloses a drive motor which is built into a camera for combined use in film winding and automatic focus control or automatic exposure control. With this type of arrangement, however, the film winding operation and automatic control operations, such as automatic focus control, are performed in different time zones in order to make efficient use of the motor output. Consequently, the sum of the times required for film winding and automatic control is essential as a time duration for single photography. This causes the photographic intervals to increase, making high-speed continuous photography impossible. A variety of cameras arranged for automatic film winding are also known wherein the drive motor for film winding is also used to automatically perform the film rewinding operation upon completion of photography. Generally, however, a film winding mechanism and a film rewinding mechanism are disposed considerably apart from each other (e.g., positioned at opposite ends of a 35 mm single-lens reflex camera body). Therefore, a larger transmission mechanism is required to transfer the drive force of a motor arranged near one mechanism (e.g., a film winding mechanism) to the other mechanism (a film rewinding mechanism), thus resulting in a complex mechanical arrangement with increased operational noise as an additional factor of inconvenience.

SUMMARY OF THE INVENTION

The primary object of the present invention is to provide a motor drive camera which permits high-speed continuous photography by minimizing the time consumed for film winding, and automatic control operations, such as, but not limited to, automatic focus control.

Another object of the present invention is to provide a motor drive camera which is capable of automatic film rewinding without the need for any complex transmission mechanism resulting in minimized operational noise.

According to the present invention, two motors are provided to respectively drive a film winding device and a control device, such as an automatic focus control device. These different types of operations can be performed in parallel or simultaneously to reduce the time required for the preparatory operation of photography, thereby enabling high-speed continuous photography. At the same time, an automatic control operation drive motor, whose location selection is comparatively free for installation, is used to rewind the film. Thus, the present invention is characterized by a drive force transmission mechanism which is simplified as much as possible, with minimized operational noise.

BRIEF DESCRIPTION OF THE DRAWINGS

The above objects, features and advantages of the invention are apparent from the following description of a preferred embodiment of the best mode of carrying out the invention taken in conjunction with the following drawings, wherein.

DETAILED DESCRIPTION OF THE PREFERRED EMBODIMENT

Figure 1:
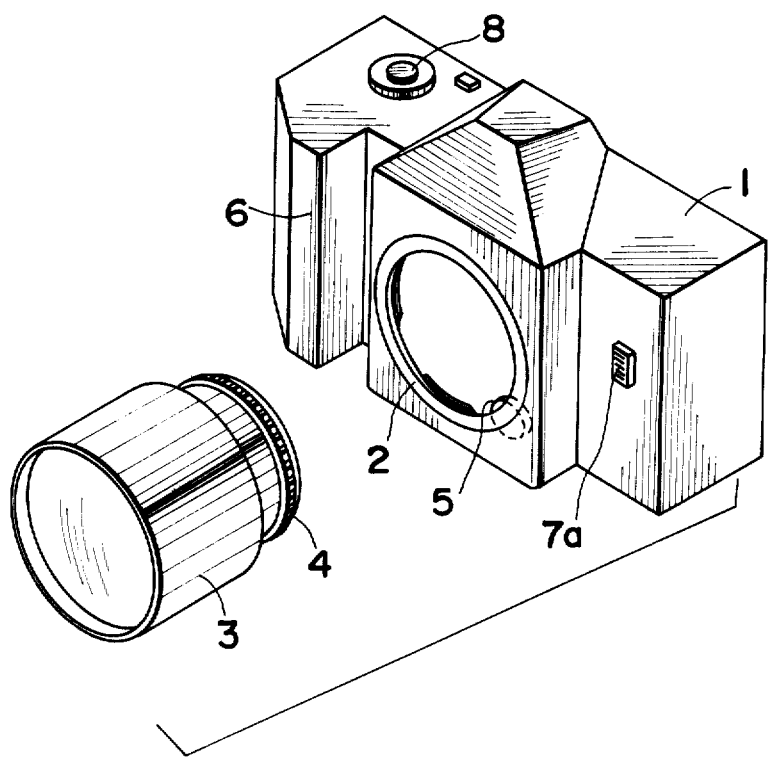
FIG. 1 is a perspective view of the outline of an embodiment according to the present invention illustrating the state of a camera from which an exchangeable lens is removed.
Figure 2:
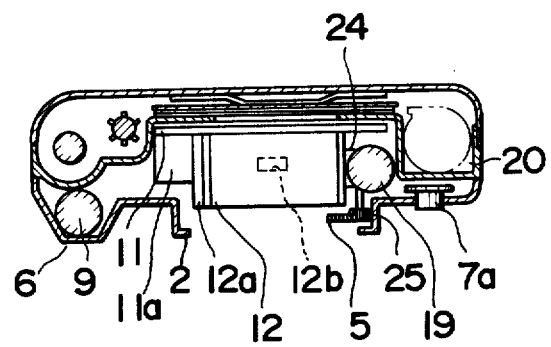
FIG. 2 is a cross-sectional view of a camera body of the embodiment in FIG. 1.
Figure 3:
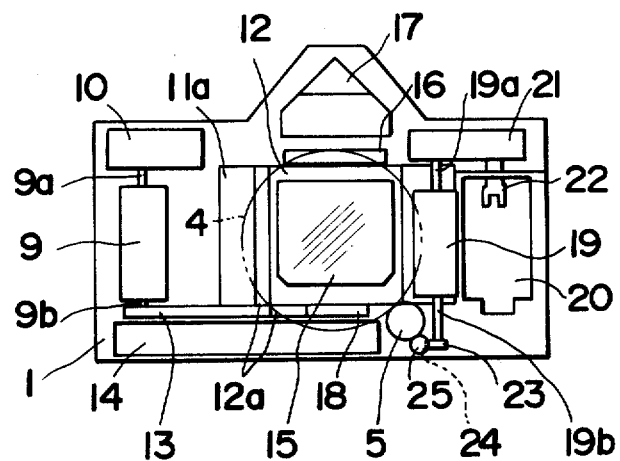
FIG. 3 is a front view schematically illustrating the internal arrangement of the embodiment in FIG. 1.

FIG. 1 is a perspective view of a single-lens reflex camera showing an embodiment of the present invention. This embodiment provides exchangeable lens 3 mountable on lens mount 2 of camera body 1. When exchangeable lens 3 is mounted on lens mount 2, gear portion 4 provided on exchangeable lens 3 engages drive gear 5. As shown in FIGS. 2 and 3, first motor 9 for film winding is arranged within camera grip 6 projecting from the left end of the front surface of camera body 1.

As shown in FIG. 3, first motor 9 is provided with two output shafts 9a and 9b projecting from the top and bottom of the motor, respectively. Top output shaft 9a is coupled to film winding mechanism 10, and bottom output shaft 9b is connected to drive mechanism 11a of unit shutter 11, as well as to charging mechanism 13 which charges a diaphragm and mirror drive mechanism 12a provided in mirror box 12, respectively. Power cell housing 14 is located beneath charging mechanism 13.

Reflecting mirror 15 rotatably pivoted inside mirror box 12 directs the photographic light passing through exchangeable lens 3 to a viewfinder optical system which includes focusing screen 16 and pentagonal prism 17. Provided on the surface of reflecting mirror 15 is an opening or semi-light transmissive portion (not shown). The light passing through the opening is reflected on an auxiliary mirror (not shown) provided perpendicular to the back of reflecting mirror 15 to pass through opening 12b formed on the floor of mirror box 12, thereby being incident upon light receiving element 18 arranged thereunder.

Second motor 19 for driving a film rewinding mechanism and automatic control device is disposed between the right side wall of mirror box 12 and film chamber 20, and is equipped with output shafts 19a and 19b projecting from the top and bottom respectively, like first motor 9. Top output shaft 19a is coupled to film rewinding mechanism 21 to drive fork member 22 projecting into film chamber 20 and rotates a film shaft therein for rewinding the film (refer to FIG. 5). Bottom output shaft 19b is coupled through gear members 23, 24 and 25 to drive gear 5 of the automatic control device.

Figure 4:
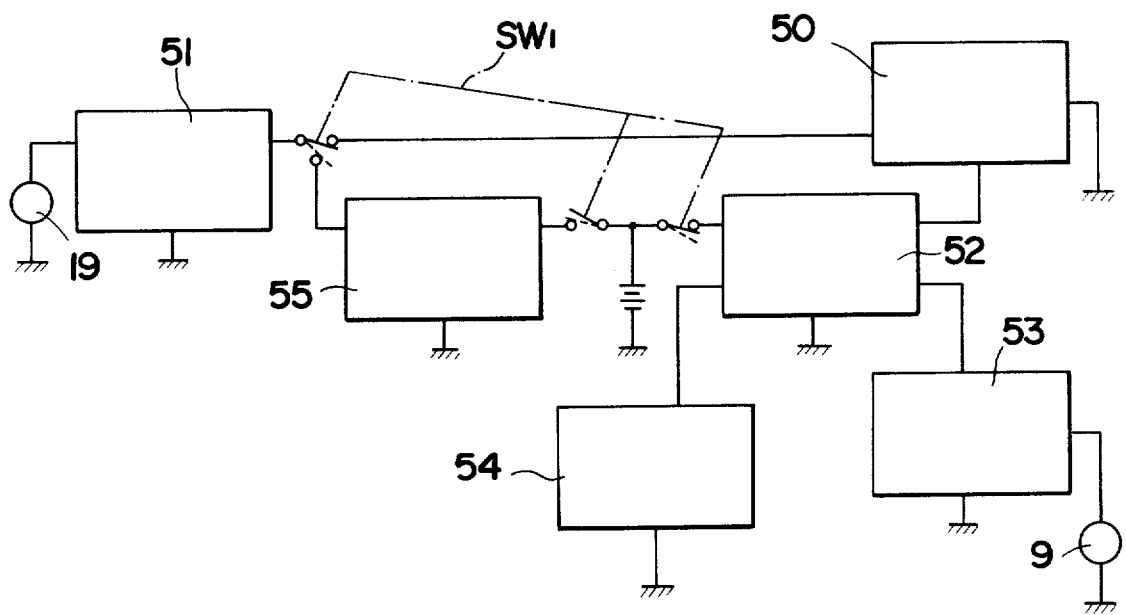
FIG. 4 is a circuit diagram built into a camera of the embodiment in FIG. 1.
Figure 5:
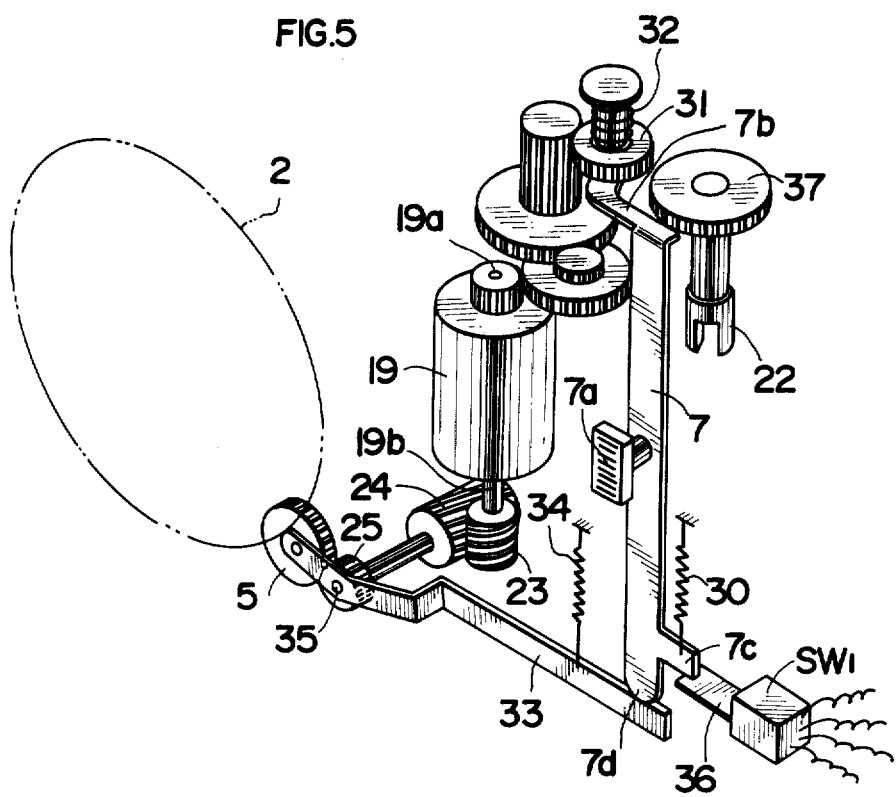
FIG. 5 is a perspective view showing the essential part of the embodiment in FIG. 1.

During continuous photography, switch member 7 integrally formed with switch knob 7a operatively disposed outside camera body 1 is biased upward by spring 30 shown in FIG. 5, whereby clutch gear 31 in film rewinding mechanism 21 (biased upward by way of bent portion 7b against spring 32) is disconnected from both second motor 19 and fork member 22. Moreover, connecting member 33 is biased counterclockwise about shaft 35 by spring 34 so as to bring drive gear 5 provided at one end of member 33 into engagement with gear portion 4 of exchangeable lens 3. When shutter release button 8 is depressed, second motor drive circuit 51 is actuated to rotate second motor 19 until an in-focus signal is generated by automatic focus drive circuit 50 shown in FIG. 4, thereby allowing gear portion 4 to be rotated through gears 23, 24 and 25 for focusing. With the input of an in-focus signal, as well as a film winding completion signal from first motor film winding drive circuit 53, sequential operation control circuit 52 generates the output of a start signal to exposure operation control circuit 54. When receiving this signal, exposure operation control circuit 54 actuates the diaphragm, mirror and shutter mechanisms to operate for photography. When exposure operation is completed, exposure operation control circuit 54 generates a photographic operation completion signal. Receiving this signal, sequential operation control circuit 52 generates outputs to automatic focus control circuit 50 and first motor drive circuit 53 for film winding, thereby actuating these circuits. With the inputs and an in-focus signal from circuit 50 and a film winding completion signal from circuit 53 to sequential operation control circuit 52, exposure operation control circuit 54 generates a start signal to actuate photographic operation in a similar manner as described above.

Figure 6:
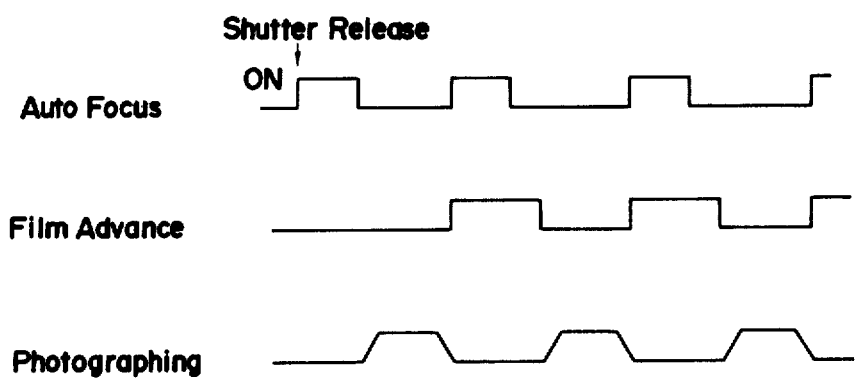
FIG. 6 is a time chart for continuous photography as performed by the camera of the embodiment shown in FIG. 1.

FIG. 6 is a time chart indicating the continuous photographic operations. As is apparent from FIG. 6, automatic focusing (AF) and film winding operations are performed at the same time.

For film rewinding, switch knob 7a may be depressed downwardly against the force of spring 30. When switch member 7 is moved downward, branch 7c of switch member 7 pushes contact piece 36 of changeover switch SW1 so that the circuit is switched as shown by the dotted line in FIG. 4. Also, bottom end 7d of switch member 7 causes connecting member 33 to be rotated clockwise pivotally on shaft 35 of gear 25 against biasing spring 34. Consequently, drive gear 5, while remaining engaged with gear 25, revolves to be disengaged from gear portion 4 fitted to exchangeable lens 3. Furthermore, when bent portion 7b is moved downward, clutch gear 31 is biased downward under the force of spring 32 to engage clutch gear 31 connected to fork member 22, thereby connecting second motor 19 and fork member 22.

It is to be noted that upon completion of the gear switch operation, changeover switch SW1 is switched and drive gear 5 is disengaged from gear portion 4. Therefore, when film rewinding drive circuit 55 is actuated in response to the circuit changeover to drive second motor 19, gear portion 4 is not driven but fork member 22 alone is driven for the film rewinding operation.

With reference to FIGS. 4 and 5, the embodiment of only an automatic focus device as an automatic control device has been described. However, the same operation may apply to an automatic exposure control device or an automatic zooming device.

According to the present invention, a film rewinding motor is provided in addition to a film winding motor, and the output from the film rewinding motor is used to enable the operation of automatic control devices such as an automatic focus control device, automatic exposure control device and zooming control device of a camera during film winding. As a result, the above control operations and film winding operation are possible simultaneously. According to the present invention, therefore, effective high-speed photography is available by minimizing photographic intervals without increasing the size of a camera body, particularly when continuous photography is performed in an automatic camera. Film rewinding is also carried out, according to the present invention, by an automatic control motor instead of a film winding motor. The provision of an automatic control motor allows a comparatively free choice of the installation locations thereof. Therefore, the motor is arranged in the vicinity of a film rewinding mechanism, thereby making possible an extremely simplified transmission mechanism and minimized operational noise.

What is claimed is:

1. A motor drive camera, comprising:
   a first motor;
   a film winding mechanism connected to said first motor, said film winding mechanism being capable of winding a film when said first motor is actuated;
   a second motor;
   a control device for automatically performing a preparatory operation prior to the commencement of an exposure;
   film rewinding mechanism for rewinding an exposed film; and
   means for connecting said second motor alternatively to said control device and to said film rewinding mechanism.

2. A motor drive camera as set forth in claim 1, wherein said first and second motors are located on opposite sides of a photographic optical path.

3. A motor drive camera as set forth in claim 2, wherein said control device includes an automatic focusing device.

4. A motor drive camera as set forth in claim 1, wherein said means for connecting includes a first clutch gear for enabling transmission from said second motor to said film rewinding mechanism, a second clutch gear for enabling transmission from said second motor to said control device, and an externally located manually operable member movable between a first position for disabling the transmission of said first clutch gear and a second position for disabling the transmission of said second gear.

5. A motor drive camera as set forth in claim 4 further comprising a control circuit for simultaneously actuating said first and second motors.

* * * * *